July 28, 1959 D. B. NICKERSON 2,897,025
FUEL PUMP BEARING
Filed Dec. 19, 1955

DOUGLAS B. NICKERSON
INVENTOR.

BY *Lyon r Lyon*

ATTORNEYS

United States Patent Office 2,897,025
Patented July 28, 1959

2,897,025

FUEL PUMP BEARING

Douglas B. Nickerson, Pasadena, Calif., assignor, by mesne assignments, to Crane Co., Chicago, Ill., a corporation of Illinois Application December 19, 1955, Serial No. 553,909

3 Claims. (Cl. 308—237)

This invention relates to a bearing and more particularly to a bearing for a fuel pump normally relying upon the fuel being pumped for lubrication but adapted to run dry for an extended period of time.

It has been found that in the type of booster pumps which are normally used to pump fuel from the tanks in modern aircraft that a serious problem exists when said tanks are dry and the pilot fails to shut off the pumps within the tanks.

In such event, the pump is running dry with the result that heat is generated in the pump bearings. This results in an expansion of the metallic pump shaft and consequent seizing of the shaft and the bearing. When this occurs, the pumps burn up and may cause an explosion within the fuel tank with disastrous consequences.

When this problem was faced, the aviation authorities were badly in need of a pump capable of running dry for an extended period of time. This in turn resulted in the requirement of a bearing which would not seize with a shaft running in said bearing, even when not lubricated.

It is the primary object of this invention to provide such a bearing.

It is a further object of this invention to provide a bearing expandable on the application of heat to accommodate an expanding shaft, thus preventing seizing of the shaft and bearing.

It is a feature of this invention that a multipart bearing is provided retained in position by a surrounding sleeve, which sleeve has a greater co-efficient of thermal expansion than the associated shaft.

These and other objects, features and advantages will be apparent from the annexed specification, in which.

Figure 1:
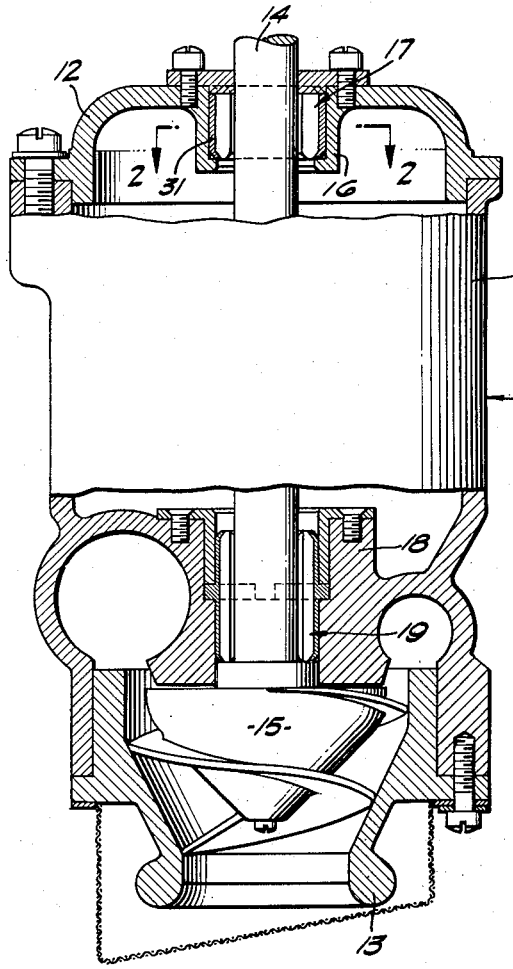
Figure 1 is a side view partly in section and with parts broken away for clarity of illustration of a pump embodying a pair of bearings manufactured in accordance with the present invention.
Figure 2:
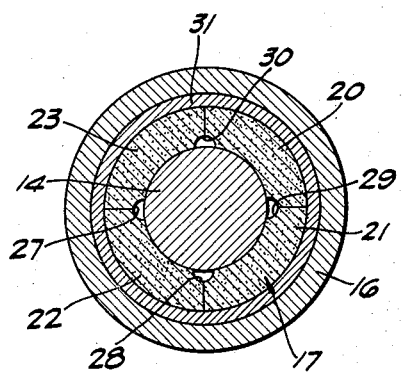
Figure 2 is a section taken along the line 2—2 of Figure 1.
Figure 3:
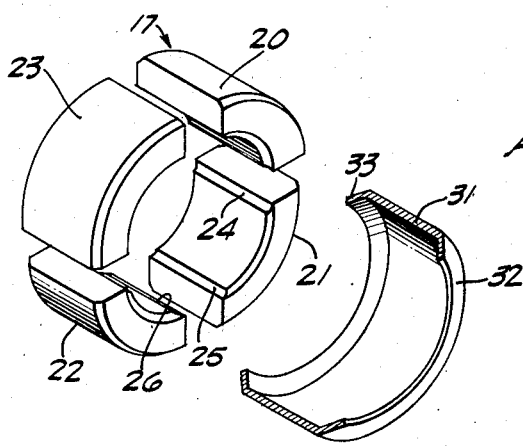
Figure 3 is an exploded view of the upper bearing shown in Figure 1.

Referring now more particularly to the drawings, there is shown a typical fuel booster pump 10 of the type used to pump fuel from aircraft fuel tanks, including a housing 11 and a cap 12 and an inlet adapter 13. The pump also includes a shaft 14 carrying an impeller 15. The cap 12 includes bearing housing 16 retaining a bearing 17 therein and the housing 11 contains bearing housing 18, which retains bearing 19. Each of the bearings 17 and 19 is preferably formed of carbon. The bearings 17 and 19 are substantially identical except for size, and a description of one can be taken as typical of both. Each of the bearings is split along a diameter preferably into four segments 20, 21, 22 and 23, as most clearly indicated in Figures 2 and 3, though it is within the scope of this invention to split the bearing along a single diameter into two equal halves. The segments 20 through 23 are notched as at 24, 25, and 26 to provide longitudinally extending grooves 27, 28, 29 and 30 extending the full length of the bearing surfaces.

A retaining sleeve 31 having flanged ends 32 and 33 surrounds each of the bearings 17 and 19 and retains the segments 20 through 23 in normal contacting position. The sleeves 31 are formed of aluminum and consequently of a material having a greater co-efficient of thermal expansion than the shaft 14 which is normally of steel.

The operation of the above-described device is as follows: In normal operation, the pump will be immersed in a body of fuel, such as aviation gasoline, to be pumped. As a result, fuel will flow through the grooves 27, 28, 29 and 30 and lubricate the bearing. However, should the tank run dry and the pump 10 continue to operate, heat will be generated in the bearings 17 and 19 with a consequent expansion of the shaft 14. Were the bearing unyieldable, this would result in a seizing of the shaft and bearing, and a burning up of the motor (not shown) normally contained in the housing 10. With the bearing of this invention, however, the heating up of the shaft and bearing also results in the heating of the sleeve 31. While the heat generated is at a maximum at the bearing surfaces of the shaft and bearing, sufficient heat is transferred through the bearing to the sleeve 31 to cause the same, due to its greater co-efficient of thermal expansion, to expand sufficiently to allow the bearing segments 20 through 23 to be forced apart by the expanding shaft. The result is that seizing of the shaft is avoided and the pump is permitted to run dry. Tests upon pumps of the above-identified type provided with bearings manufactured in accordance with this invention have been run for approximately twenty hours without failure.

While there has been described what is at present considered the preferred embodiment of the invention, it will be understood that various changes and alterations may be made therein without departing from the essence of the invention, and it is intended to cover herein all such changes and alterations as come within the true scope and spirit of the annexed claims.

I claim:

1. A bearing and shaft assembly comprising a steel shaft, a carbon bushing split into a plurality of segments and a sleeve surrounding said segments, said sleeve being formed of a metal having a higher co-efficient of thermal expansion than the material of the shaft.

2. A bearing and shaft assembly comprising a steel shaft, a carbon bushing split into four segments and a sleeve surrounding said bushing, said sleeve being formed of a metal having a higher co-efficient of thermal expansion than the shaft material.

3. A bearing comprising a carbon bushing split into four segments and an aluminum sleeve surrounding said segments.

References Cited in the file of this patent

UNITED STATES PATENTS

| | | |
|---|---|---|
| 421,089 | Wood | Feb. 11, 1890 |
| 1,985,781 | Hufferd et al. | Dec. 25, 1934 |
| 2,041,896 | McQueer | May 26, 1936 |
| 2,590,761 | Edgar | Mar. 25, 1952 |